J. A. HECKMAN.
BALL BEARING CAR WHEEL.
APPLICATION FILED JAN. 10, 1914.
1,097,430.
Patented May 19, 1914.
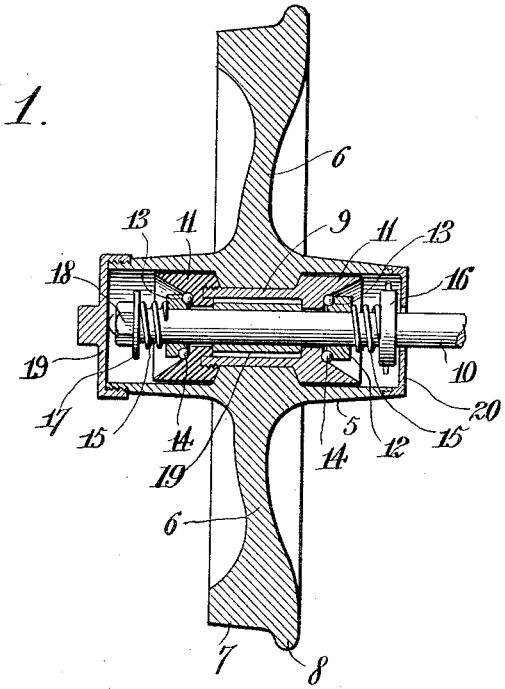
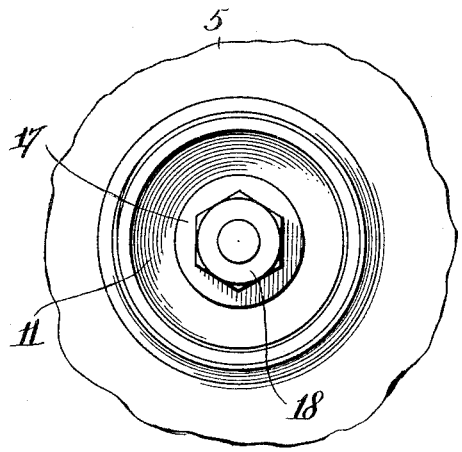
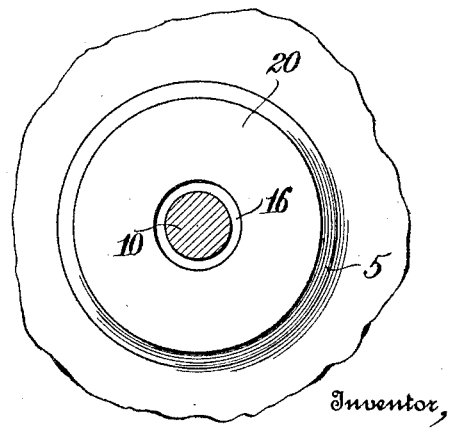
Inventor,
John A. Heckman.
By Victor J. Evans,
Attorney.

UNITED STATES PATENT OFFICE.

JOHN A. HECKMAN, OF FRIEND, NEBRASKA.

BALL-BEARING CAR-WHEEL.

1,097,430. Specification of Letters Patent. Patented May 19, 1914.

Application filed January 10, 1914. Serial No. 811,448.

*To all whom it may concern:*

Be it known that I, JOHN A. HECKMAN, a citizen of the United States, residing at Friend, in the county of Saline and State of Nebraska, have invented new and useful Improvements in Ball-Bearing Car-Wheels, of which the following is a specification.

The invention relates to vehicle wheels, and more particularly to the class of ball bearing car wheels.

The primary object of the invention is the provision of a car wheel wherein the ball bearings are placed therein so that pressure thereupon is distributed to avoid the crushing of the bearings, and will not become disturbed resultant from jars or shocks incident to the travel of the wheel.

Another object of the invention is the provision of a car wheel wherein the ball bearings are so held therein that should any shocks or jars occur during the travel of the wheel the same will be absorbed through the medium of tension springs, thereby avoiding the crushing or damage to the bearings.

A further object of the invention is the provision of a car wheel wherein the friction is reduced to a minimum while the same is traveling, and any lateral thrust of the wheel will be absorbed, thereby assuring maximum life to the wheel and its bearings.

With these and other objects in view, the invention consists in the construction, combination and arrangement of parts as will be hereinafter fully described, illustrated in the accompanying drawing, and pointed out in the claims hereunto appended.

In the drawing:—Figure 1 is a vertical transverse sectional view through a car wheel and bearings constructed in accordance with the invention. Fig. 2 is a fragmentary side elevation of the wheel. Fig. 3 is a similar view, looking toward the opposite side of the same.

Similar reference characters indicate corresponding parts throughout the several views in the drawing.

Referring to the drawing in detail, the wheel comprises a hub 5, spokes 6, and rim 7, the same being formed with the usual track flange 8, and within the hub is mounted a hard steel boxing 9, through which is passed the axle end 10 which is of the ordinary well-known construction.

The boxing is formed with inwardly tapered cone ends 11, while loosely surrounding the axle 10 are collars 12, the same being located on opposite sides of the wheel and are formed with ball race-ways 13 in which are engaged independent series of bearing balls 14, the latter being adapted to travel in the inwardly tapered cone ends 11 of the boxing 9.

The bushing 19 is fixed on the axle 10, and against which abuts the boxing 9 so as to prevent displacement of the wheel longitudinally on the axle. It will be noted that the bushing is spaced from the boxing 9 and also that the said boxing is spaced from the axle so that any pressure exerted upon the wheel or axle will allow the boxing to run momentarily upon the axle, yet the shock or jar will be absorbed by the springs 15 which automatically adjust the cone 12. The boxing as shown is formed in two parts so as to permit the fitting of the same within the wheel and on the axle about the bushing thereon.

Working against the outer faces of the collars 12 and surrounding the axle 10 are coiled expansion springs 15, the outer end of one of the springs 15 being seated against a ring 16 suitably fixed to the axle and within the inner end of the hub 5, while the outer end of the other spring 15 is seated against a washer 17 carried upon the axle 10 and held in place by means of a nut 18 threaded on the outer end of the said axle. It will be apparent that when any shock or jar occurs during the travel of the wheel the collars 12 will become displaced and the bearing balls 14 will be free to work upon the inclined wall of the cone ends 11 in the boxing 9 held within the hub, thereby obviating the crushing of the bearing balls, and the shock or jar incident to the travel of the wheel will be absorbed by the springs 15, which serve to hold the collars 12 in relative working relation within the cone ends 11 of the boxing in the said hub.

The outer end of the hub 5 has detachably mounted thereon a closure cap 19 which is of the ordinary well-known construction, while the inner end of the hub is formed with a mud flange 20, as usual.

From the foregoing it is thought that the construction and manner of operation of the device will be clearly understood, and therefore a more extended explanation has been omitted.

What is claimed is:—

1. A car wheel comprising a hub having a boxing formed with inwardly tapered cone ends, collars working within the cone ends and having ball race-ways, bearing balls held within the race-ways and working against the inclined wall of the cone ends of the boxing, and resilient means acting upon the collars for sustaining the same in working relation within the cone ends of the boxing.

2. A car wheel comprising a hub having a boxing formed with inwardly tapered cone ends, collars working within the cone ends and having ball race-ways, bearing balls held within the race-ways and working against the inclined wall of the cone ends of the boxing, resilient means acting upon the collars for sustaining the same in working relation within the cone ends of the boxing, and an axle supporting the collars and passed through the boxing.

3. A car wheel comprising a hub having a boxing formed with inwardly tapered cone ends, collars working within the cone ends and having ball race-ways, bearing balls held within the race-ways and working against the inclined wall of the cone ends of the boxing, resilient means acting upon the collars for sustaining the same in working relation within the cone ends of the boxing, an axle supporting the collars and passed through the boxing, and means for tensioning the resilient means.

In testimony whereof I affix my signature in presence of two witnesses.

JOHN A. HECKMAN.

Witnesses:
JOHN SCHMIDT,
MABEL JEWITT.

---

Copies of this patent may be obtained for five cents each, by addressing the "Commissioner of Patents, Washington, D. C."